US011669454B2

(12) United States Patent
Geetha et al.

(10) Patent No.: US 11,669,454 B2
(45) Date of Patent: Jun. 6, 2023

(54) HYBRID DIRECTORY AND SNOOPY-BASED COHERENCY TO REDUCE DIRECTORY UPDATE OVERHEAD IN TWO-LEVEL MEMORY

(71) Applicant: Intel Corporation, Santa Clara, CA (US)

(72) Inventors: Vedaraman Geetha, Fremont, CA (US); Jeffrey Baxter, Cupertino, CA (US); Sai Prashanth Muralidhara, Portland, OR (US); Sharada Venkateswaran, San Francisco, CA (US); Daniel Liu, Walnut Creek, CA (US); Nishant Singh, Bengaluru (IN); Bahaa Fahim, Santa Clara, CA (US); Samuel D. Strom, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 16/405,691

(22) Filed: May 7, 2019

(65) Prior Publication Data

US 2020/0356482 A1 Nov. 12, 2020

(51) Int. Cl.
  *G06F 12/0817* (2016.01)
(52) U.S. Cl.
  CPC .. *G06F 12/0817* (2013.01); *G06F 2212/1021* (2013.01); *G06F 2212/608* (2013.01)
(58) Field of Classification Search
  None
  See application file for complete search history.

(56) References Cited

U.S. PATENT DOCUMENTS 7,373,466 B1 * 5/2008 Conway ............... G06F 12/082
                                                          711/156
9,418,009 B2 * 8/2016 Moga ................. G06F 12/0811
(Continued)

FOREIGN PATENT DOCUMENTS

| CN | 109684237 A | 4/2019 |
| WO | 2012/024090 A2 | 2/2012 |
| WO | 2017/023252 A1 | 2/2017 |

OTHER PUBLICATIONS

European Search Report and Search Opinion, EP App. No 20164224.6, dated Aug. 31, 2020, 11 pages.
(Continued)

*Primary Examiner* — Sanjiv Shah
*Assistant Examiner* — Alexander J Yoon
(74) *Attorney, Agent, or Firm* — Nicholson De Vos Webster & Elliott LLP

(57) ABSTRACT

A processor includes one or more cores having cache, a cache home agent (CHA), a near memory controller, to near memory, and a far memory controller, which is to: receive a first memory read operation from the CHA directed at a memory address; detect a miss for the first memory address at the near memory; issue a second memory read operation to the far memory controller to retrieve a cache line, having first data, from the memory address of far memory; receive the cache line from the far memory controller in response to the second memory read operation; and send the cache line to the CHA with a forced change to a directory state of the cache line at the CHA, the forced change to cause the CHA to snoop remote sockets to maintain data coherence for the cache line in an absence of directory state in the far memory.

24 Claims, 11 Drawing Sheets

(56) References Cited

U.S. PATENT DOCUMENTS

| | | | |
|---|---|---|---|
| 9,558,116 B2* | 1/2017 | Rozas | G06F 12/084 |
| 9,619,396 B2 | 4/2017 | Blankenship et al. | |
| 2007/0079072 A1* | 4/2007 | Collier | G06F 12/0826 |
| | | | 711/133 |
| 2009/0113139 A1* | 4/2009 | Pudipeddi | G06F 12/0817 |
| | | | 711/146 |
| 2010/0106912 A1* | 4/2010 | Cypher | G06F 12/0817 |
| | | | 711/141 |
| 2015/0143050 A1* | 5/2015 | Rowlands | G06F 9/50 |
| | | | 711/128 |
| 2016/0283112 A1* | 9/2016 | Blankenship | G06F 12/0824 |
| 2017/0185515 A1* | 6/2017 | Fahim | G06F 12/0891 |
| 2018/0189180 A1 | 7/2018 | Fahim et al. | |
| 2019/0042429 A1* | 2/2019 | Kumar | G06F 12/0831 |

OTHER PUBLICATIONS

Intention to Grant, EP App. No. 20164224.6, dated Mar. 1, 2022, 7 pages.
Decision to grant a European patent, EP App. No. 20164224.6, dated Jul. 14, 2022, 2 pages.

* cited by examiner

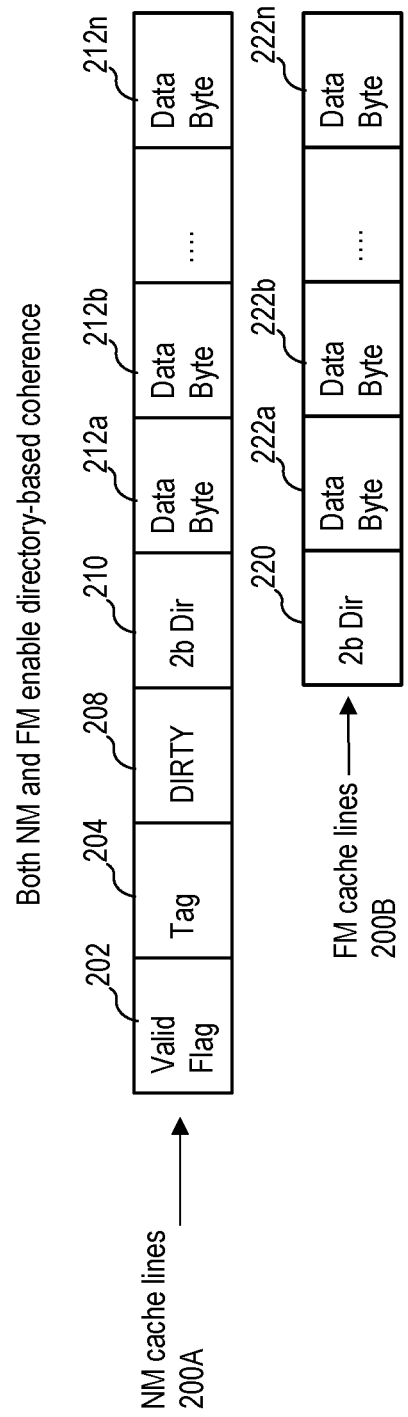
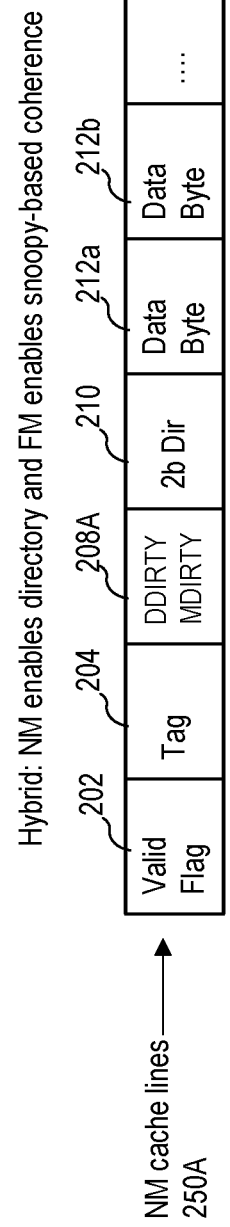
FIG. 2A
FIG. 2B

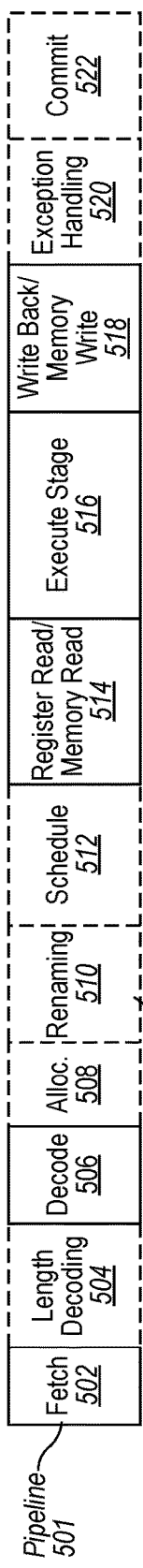
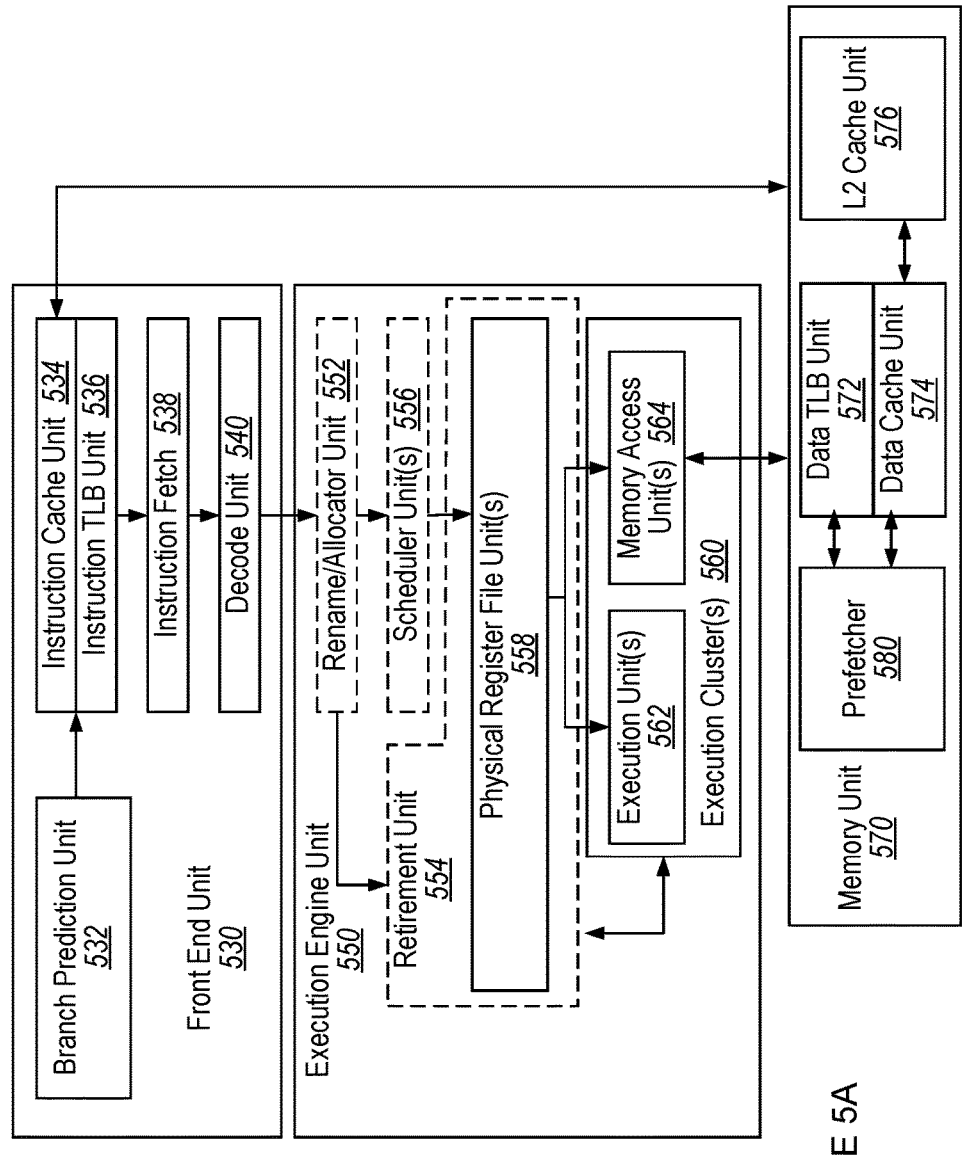
FIGURE 5A
FIGURE 5B

HYBRID DIRECTORY AND SNOOPY-BASED COHERENCY TO REDUCE DIRECTORY UPDATE OVERHEAD IN TWO-LEVEL MEMORY

TECHNICAL FIELD

The disclosure relates to maintaining coherency in cache-based memory, and more particularly, to hybrid directory and snoopy-based coherency to reduce directory update overhead in two-level memory.

BACKGROUND

Two-level memory (2LM) is a hierarchical memory subsystem to enable new high-capacity non-volatile memory (NVM) technology as the system memory. An example of such high-capacity NVM technology is deployed in three-dimensional (3D) Xpoint™ (3DXP) memory by Intel® of Santa Clara, Calif. While high-capacity NVM is significantly better than other storage technologies in terms of latency and bandwidth (BW), it is still worse than dynamic random access memory (DRAM) in both. In 2LM, DRAM is used as a near memory (NM) cache in front of the system memory, referred to as far memory (FM), to filter out the majority of the references from going to the system memory. In this way, the 2LM memory subsystem mitigates the significant negative impact on performance from lower-than-DRAM performance of the high-capacity NVM, while still exploiting the capacity and cost benefits of the high-capacity NVM.

BRIEF DESCRIPTION OF THE DRAWINGS

FIG. 2A is set of example cache lines in two-level memory in which coherence in both near memory (NM) and far memory (FM) is tracked with a directory according to an embodiment.

FIG. 2B is a set of example cache lines in two-level memory in which coherence in NM is via a directory and coherence in FM is via a snooping protocol, according to an embodiment.

FIG. 5A is a block diagram illustrating an in-order pipeline and a register renaming stage, out-of-order issue/execution pipeline according to one embodiment.

FIG. 5B is a block diagram illustrating a micro-architecture for a processor or an integrated circuit that may implement hardware support for hybrid directory and snoopy-based coherency, according to an embodiment of the disclosure.

DETAILED DESCRIPTION

Figure 1:
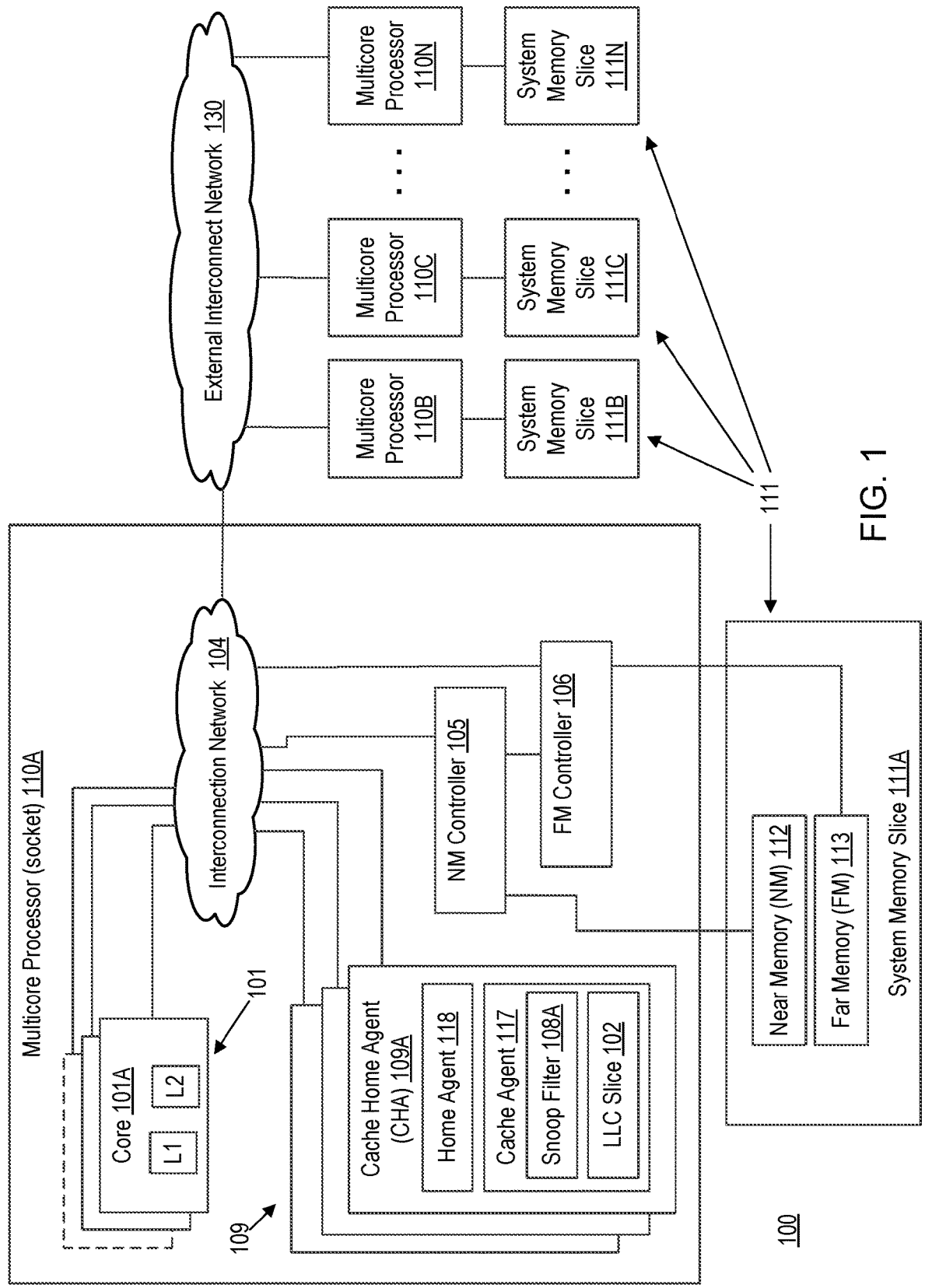
FIG. 1 is a block diagram of a system for hybrid directory and snoopy-based coherency to reduce directory update overhead in two-level memory, according to various embodiments.

In large shared memory multi-socket servers (e.g., with two to eight sockets each having multiple processor cores), an in-memory directory is commonly used to maintain memory coherence of shared memory. The in-memory directory keeps track of whether a remote socket's caching agent (CHA—caching home agent complex) have a cached copy of a line that is homed in (e.g., local to) that memory at a cache line granularity. A memory read operation (or simply "a read") may return the directory state of the line along with the data which tells the CHA if snoops need to be issued to invalidate cached copies of the line in other sockets. An in-memory directory may often require extra memory write operations (or simply "writes") to maintain the directory state in addition to the application-generated data writes. An alternative mechanism to maintain coherence is to issue snoops to all sockets for each read, called the snoopy mechanism.

To snoop is to send directed messages from the CHA to all other sockets in the system and receive a response from each at the end of which none of the other sockets will have an exclusive or modified copy of the line. The actual response depends on the type of snoop message sent which could ask to invalidate the line from the cache or down grade the line to shared state. In either case any modified data is returned to the requesting CHA and/or to the original requester of the data.

Since the snoopy mechanism is not scalable to large multi-socket systems as the snoop bandwidth becomes unsustainable at the external and internal interconnect at the high memory bandwidth levels of current double data rate (DDR) DRAM memory, modern server processors generally use some form of directory-based protocol. As discussed previously, two-level memory (2LM) includes DRAM-based memory as near memory (NM), also referred to as first-level memory, and high-capacity non-volatile memory (NVM) as the far memory (FM), which is also referred to as second-level memory. In order to maintain a directory-based protocol in 2LM architecture, the NM is to maintain and update directory state for the lines in the NM caches. This creates additional writes to FM when the NM cache evicts lines as these lines are "dirty" even if only the directory state of the line has been changed, e.g., without any change to the data, in order to continue to maintain directory state in the FM. Since FM write memory bandwidth is much lower than traditional DRAM write bandwidth, these additional directory-generated writes may accelerate FM write bandwidth saturation, and negatively impact performance on 2LM architecture. Furthermore, FM memory wears out with increased writes.

In various embodiments, these additional writes to FM for updating the directory may be eliminated by using a snoopy-based protocol for coherency of the FM part of the 2LM memory architecture, e.g., for cache lines homed in the FM. In these embodiments, the NM may continue to use a directory-based coherence mechanism for cache lines present in the near memory. For example, the NM may maintain an in-memory directory based coherence for scalability in large multi-socket systems, while the FM may implement a snoop-based coherence, thus eliminating directory update overhead writes to the FM.

With more particularity, a memory operation that hits in the NM is to be subject to directory-based coherence where snoops are generated only if the directory state indicates the need for snooping. Any access that misses the NM and gets data from the FM, however, is to snoop the other sockets, which means there is no need to maintain a directory in the FM. What makes this hybrid coherency arrangement especially viable is that the memory bandwidth at the 3DXP FM is a small fraction of the DDR NM bandwidth, and that the DDR NM shields the 3DXP FM from a very large portion of the memory accesses, thus directly improving application performance running on these multi-socket servers.

In one embodiment, a processor includes a cache home agent (CHA) coupled to the cache (e.g., of multiple cores), a near memory controller coupled to the CHA, to near memory, and to a far memory controller. The near memory controller is to receive a first memory read operation from the CHA directed at a first memory address, detect a miss for the first memory address at the near memory, and issue, in response to detection of the miss, a second memory read operation to the far memory controller to retrieve a cache line, having first data, from the first memory address of far memory. The NM memory controller may further receive the cache line from the far memory controller in response to completion of the second memory read operation, and send the cache line to the CHA with a forced change to the directory state of the cache line at the CHA. The forced change is to cause the CHA to snoop remote sockets of a multi-socket system for the cache line to maintain data coherence for the cache line in an absence of directory state in the far memory.

FIG. 1 is a block diagram of a computing system 100 for hybrid directory and snoopy-based coherency to reduce directory update overhead in two-level memory, according to various embodiments. The computing system 100 includes multiple multicore processors 110A, 110B, 110C, . . . 110N, which interconnect with each other over an external interconnect network 130, e.g., a QuickPath Interconnect (QPI) or Ultra-Path Interconnect (UPI) of Intel® Corporation. Each multicore processor may be considered to be a socket, and thus be instantiated on a single die or integrated circuit. The multicore processor 110A will be discussed in more detail as being exemplary of each of the multicore processors 110B . . . 110N, e.g., remote sockets. The computing system 100 may also communicate with input/output (I/O) devices, which may include, for example, input devices (e.g., keyboard, touchscreen, mouse), display devices, graphics cards, ports, network interfaces, storage devices, and the like.

In various embodiments, the multicore processor 110A includes multiple processing cores 101 interconnected to a set of distributed cache home agents (CHAs) 109 through an interconnection network 104 of the multicore processor 110A. A core 101A of the multiple cores is illustrated by way of example, as is a CHA 109A of the distributed CHAs 109. Each of the processing cores 101 may include a level one (L1) cache and a level two (L2) cache.

With additional reference to FIG. 1, the multicore processor 110A may further include an NM controller 105 coupled to near memory (NM) 112 of a system memory slice 111A, and a FM controller 106 coupled to far memory (FM) 113 of the system memory slice 111A. The system memory slice 111A may be located off-chip of the multicore processor 110A socket and be a part of overall system memory 111 for the computing system 100. In embodiments, the NM controller 105 and the FM controller 106, the multiple processing cores 101, and the multiple CHAs 109 interconnect with each other through an interconnection network 104 that is internal to the multicore processor 110A. In different embodiments, the interconnection network 104 is a Peripheral Component Interconnect (PCI™) bus, such as the Peripheral Component Interconnect express (PCIe™) bus, or another custom bus. In embodiments, although not specifically illustrated, the system memory slices 111A . . . 111N each include a respective NM slice and a respective FM slice, as illustrated by the NM 112 and the FM 113 portions of the system memory slice 111A. Each NM slice may act as a local cache for its corresponding FM slice.

In one embodiment, the NM 112 has a smaller size and is a faster access memory than a second memory device that functions as the FM 113. In one embodiment, the NM 112 is DRAM, e.g., DDR DRAM, which caches data in the FM 113, which may be a three dimensional cross point memory having more storage than the NM 112. The FM 113 may have a larger space than the NM 112, and be a solid state drive (SSD) or other type of storage or memory device, such as a three dimensional multilayer stacked cross point memory array. The FM 113 may implement other non-volatile memory types, such as NAND memory cells, ferroelectric random-access memory (FeTRAM), nanowire-based non-volatile memory, as phase change memory (PCM), memory that incorporates memristor technology, Magnetoresistive random-access memory (MRAM), Spin Transfer Torque (STT)-MRAM, Resistive Random Access Memory (ReRAM), byte addressable non-volatile RAM (NVRAM), and the like.

According to embodiments of the computing system 100, each CHA 109 includes a cache agent (CA) 117 and a home agent (HA) 118. The cache agent 117 may further include a last level cache (LLC) slice 102 and a snoop filter 108A. The CA may be responsible for local coherence and processor-side cache interface, while the HA may be responsible for global coherence and a system memory interface.

In various embodiments, each LLC slice (of each CHA) is responsible for acting as a last level cache of the multicore processor 100 for a "slice" (or portion) of system memory addresses. Which particular system memory addresses map to which LLC slice may be determined by a hashing function within each of the multiple processing cores 101. In operation, when a processing core needs to evict a cache line from its own internal L2 cache or read a cache line that is not found in its L2 cache, the processing core hashes the address of the desired cache line. The output of the hashing function identifies to which LLC slice the cache line request is to be directed. The processing core then directs the cache line request to the correct CHA via the interconnection network 104.

In embodiments, the respective snoop filters 108A of the distributed CHA 109 track coherence protocol states, referred to herein as directory states, of the cache lines having system memory addresses that hash to its resident CHA and are cached in an L1 or L2 cache. The directory states may be MESI states, MSI states, or other types of coherence protocol states. In embodiments, the snoop filter 108A keeps a table that tracks the directory states of the cache lines that are cached in any L1 or L2 caches of the above processing cores 101 but that would hash to the CHA 109A if evicted. Thus the snoop filters of the distributed CHA 109 are able to track the coherence protocol states of the cache lines in the L1 and L2 caches of the coupled processing cores 101.

As the computing system 100 contains multiple multicore processors 110A . . . 110N, each multicore processor has its own associated system memory slice 111B, 111C, . . . 111N. Like the last level caching approach, each system memory slice is responsible for its own "slice" (or portion) of system memory addresses. For example, when a cache line is evicted from an LLC instance, the "caching agent" function associated with the CHA to which the LLC slice belongs determines to which system memory slice the cache line should be directed. Similarly, when a core issues a read that is not found in the snoop filter or LLC of the CHA targeted by the read, the CA associated with the CHA targeted by the read may determine to which system memory slice the cache line should be directed.

For any cache line accessed by the multicore processor 110A, if the cache line is to be directed to the "local" system memory 111A, the cache line is directed to the local NM controller 105 through the "home agent" functionality of the CHA. If the cache line is to be directed to a remote system memory 111B . . . 111N component, the cache line is directed to a remote processor, e.g., one of the multicore processors 110B . . . 110N. For example, if a cache line that is evicted from the LLC 102 is to be stored in the local system memory slice 111A, the cache line is sent through the internal interconnection network 104 to the NM controller 105. In contrast, if the cache line is to be directed to one of the remote system memory slices 111B . . . 111N, the cache line is directed to one of the remote multicore processors 110B . . . 110N through the internal interconnect network 104 to the external interconnect network 230 for storage in the system memory slice of a remote multicore processor. In one embodiment, the NM cache lines are direct mapped to addresses in the FM 113, with tags stored in the cache lines. The cache lines may be indexed.

In operation, for any read or write operation (e.g., request directed at a particular memory address), the NM controller 105 may perform a read into NM 112 to see if the cache line for the memory address is cached there. If so (near memory cache hit), the NM controller 105 performs the requested operation and keeps the cache line in the NM 112, optionally updating a directory state for the cache line at the NM 112 depending on a value of a directory opcode in the read/write operation issued by the HA 118. In the case of a read, a copy of the requested cache line is sent to the requestor and the cache line data is not written over in the NM 112, e.g., is kept in NM. In the case of a write, the new data for the cache line that was received in the request is written over the old cache line data in the NM 112. This write of the cache line may be combined with an update of the directory state (e.g., an update of directory bits) as a single write. For example, consider a remote code read opcode that indicates that the memory directory should be updated to a shared (S) state.

In one embodiment, for purposes of explanation, the coherence protocol may employ at least three states including invalid (I), shared (S), and any (A). The invalid or I-state indicates the line is not present in any remote socket, but may be present in the local socket cache. The shared or S-state indicates that the line is unmodified and potentially shared across multiple sockets. When a line is found in shared state, the CHA 109A does not need to snoop all the sockets if the requestor is asking for a read-only copy of the line. The any (or A-state) indicates that the line could be present in any socket in any state, modified or not modified. When a line is found in A-state, the CHA 109A issues snoops to the remote sockets to get the latest copy of the line and to invalidate or update the state of the line as necessary to return data to the requester.

If the requested cache line is not found in NM 112 (near memory cache miss), in the case of a read, the NM controller 105 reads the cache line from the FM 113, sends a copy of the cache line to the requestor, and writes the cache line into NM 112. Furthermore, in one embodiment, the NM controller 105 sends the cache line (including data) to the CHA 109A with a forced change to the directory state of the cache line at the CHA, e.g., to the A-State. This forced change causes the CHA to snoop remote sockets (e.g., the multicore processors 110B . . . 110N) for the cache line to maintain data coherence for the cache line in the absence of directory state in the far memory FM 113. In this way, the NM controller 112 ensures that the CHA 109A enforces the snoopy mechanism for cache line data retrieved from the FM 113. In the case of a write when the requested cache line is not found in the NM 112, the NM controller 105 may simply write the cache line that was received with the request into the FM 113. No copy may be placed in the NM 112. Thus, if there is no "hit" in near memory, a read will evict the cache line in NM but a write will not evict the cache line in NM.

For purposes of explanation, assume that the NM 112 and the FM 113 enable directory-based coherence tracking. FIG. 2A is set of example cache lines in two-level memory in which coherence in both the NM 112 and the FM 113 is tracked with a directory according to an embodiment. In one embodiment, an in-memory directory is enabled by using two bits from the error correction code (ECC) bits of a cache line. These bits are read and written when data is read and written to memory in a single operation without any overhead. There are cases when the directory mechanism calls to updating only the directory bits without the need to update data. However, such an update will conventionally have to provide the original data along with the new directory state that needs to be updated such that both data and directory state are written. Accordingly, any directory-only update necessary to maintain coherence is overhead or cost of the directory mechanism.

In one embodiment, with reference to FIG. 2A, NM cache lines 200A each include a valid flag 202 indicating whether the NM cache line 200A has valid data, a tag 204 used to form an address for the NM cache line 200A in the FM 113 when combined with the index location of the NM cache line 200A in the NM 112, a dirty bit 208 to indicate whether the data has been changed, e.g., via a write operation, two directory bits 210 (e.g., of the ECC bits) that encode the directory state, and one or more data bytes 212a, 212b, 212n. The two directory bits 210, when viewed across all the NM cache lines 200A, constitute a NM directory reflecting coherence protocol states the NM 112.

In the embodiment of FIG. 2A, FM cache lines 200B include two directory bits 220 and one or more data bytes 222a, 222b, . . . 222n. The two directory bits 220, when viewed across all the FM cache lines 200B, constitute a FM directory reflecting coherence protocol states of the FM 113. Generating numerous directory update writes to the FM 113, however, will negatively impact performance due to the higher latency and lower bandwidth available for writing to far memory, as well as more quickly wear out the NVM of the far memory, which can withstand a limited number of writes over their lifetime.

Instead, disclosed herein is hybrid directory approach for NM and snoop-based approach for FM, according to various embodiments. In order to not write back directory state to the FM 113, however, the NM controller 105 is to differentiate between NM data being dirty and NM directory state being dirty. By so differentiating, the NM controller 105 need to only write data back to FM only when the data (as opposed to the directory state) is dirty.

FIG. 2B is a set of example cache lines in two-level memory in which coherence in NM is via a directory and coherence in FM is via a snooping protocol, according to an embodiment. In one embodiment, NM cache lines 250A is similar to the NM cache lines 200A of FIG. 2A, except that instead of the dirty bit 208, is now a pair of metadata bits 208A. The pair of metadata bits 208A may include a first bit (DDIRTY) to indicate whether the data in the cache line is dirty and a second bit (MDIRTY) to indicate whether the directory bits 210 are dirty, providing the differentiation just discussed. For example, the first bit (DDIRTY) is set when the NM cache data is modified and cleared otherwise.

Further, the second bit (MDIRTY) is set when directory state alone is updated in the NM cache, but the accompanying data is not modified. The FM cache lines 250B, which are similar to the FM cache lines 200B of FIG. 2A, now need not employ use of the ECC bits to encode a directory state, as there will be no directory of FM cache lines 250B. Instead, the distributed CHAs 109 will be forced to employ snoop-based protocol with directed snoop messages to all other sockets.

Conventionally, directory-based coherence protocols could not distinguish between a data write and a directory-only write. With the differentiation in the NM cache lines 250A with the DDIRTY and MDIRTY bits, there is now a need to distinguish directory-only writes form other data writes. Identifying a directory-only write may be performed in one of two ways, namely implicitly or explicitly.

In one embodiment, implicit directory updates are those in which the NM controller 105 updates the directory state based on the current directory state that is read from memory and the opcode that is sent from the home agent (HA) 118 in a memory operation. Implicit directory updates are not dependent on any snoop responses. In the case of these implicit directory updates, the NM controller 105 inspects the MDIRTY bit versus the DDIRTY bit of the cache line read from the NM 112, and sets only the MDIRTY bit for the implicit directory update on NM hits. For implicit directory updates on NM fills (NM misses), the MDIRTY bit may be set and the DDIRTY bit is cleared.

One example that may cause an implicit directory update is as follows. The NM controller 105 may do a local read from multicore processor 110A socket and receive data back with a directory bit set to State-A, e.g., one of other sockets might have the cache line. Then the NM controller 105 will send the directory state to the CHA causing the CHA to do a snoop of the remote sockets, which may result in none of the remote sockets having the cache line. In this case, the NM controller 105 does not have to proactively change the directory state. But, the NM controller 105 wants to avoid having to keep snooping to get nothing, so the NM controller 105 may change the directory state to I-State based on the incoming read opcode from the CHA, and knowing that none of the remote sockets will have a copy of the line by the end of the snooping process. This is an example of an implicit directory-only update.

Explicit directory updates from the HA 118 depend on snoop responses in addition to the current directory state. For these updates, the HA 118 (and thus the CHA 109A) sends a directory-only update indication to tell the NM controller 105 that data is not being updated for this write. In this case also, the NM may only set the MDIRTY bit and clear the DDIRTY bit. Specifically, the NM should have previously indicated to the HA in the data returned from NM to the HA that this line was clean (DDIRTY=0) when it was read from NM 112. The HA may use this information and its knowledge of directory-only update to signal the directory-only write to NM controller 105. The NM controller 105 is also to provide an indication that the cache line was clean when it was read by the NM controller 105 as the HA does not have the history information for the cache line, which only the NM controller 105 can provide.

Accordingly, to determine that the memory write operation is a directory-only write, the NM controller 105 is to receive a direct indication of the directory-only write in the memory write operation from the CHA 109A. The direct indication may be based in part on a previous indication received by the CHA 109A from the NM controller 105, in response to a previous memory read operation, that the first bit (DDIRTY) indicated the first data was clean.

When a line is selected for eviction from the NM 112, if the MDIRTY bit is set indicating metadata is modified but the DDIRTY bit is not set indicating data is clean, this line should not be written to FM 113, as this is a directory-only write and the FM 113 is implementing a snoopy mechanism. Indeed, it is possible to simplify and enable this feature even without the MDIRTY bit since the DDRITY bit alone suffices, e.g., the DDIRTY bit being clear indicates that the NM cache line being evicted need not be written to the FM.

With the above-described hybrid coherence mechanism, each read from FM 113 to NM 112 will incur a snoop cost. This is acceptable for at least two reasons. First, the FM read bandwidth is not as high as the NM read bandwidth, and second, in 2LM systems, one expects the NM hit rate to be high such that the bandwidth of accesses generated to the FM should be low. Beyond this, if the application causes directory-only writes to the FM when the application is itself FM-write-bandwidth limited, the performance will degrade. Hence, it is a good trade-off to generate snoops for FM reads to eliminate FM directory update only writes. An advantage of this mechanism is that directory-based coherence protocol is still enabled in the NM controller 105, making the directory-based coherence protocol scalable to large multi-socket 2LM configurations, particularly where the NM hit rate is reasonable.

Figure 3:
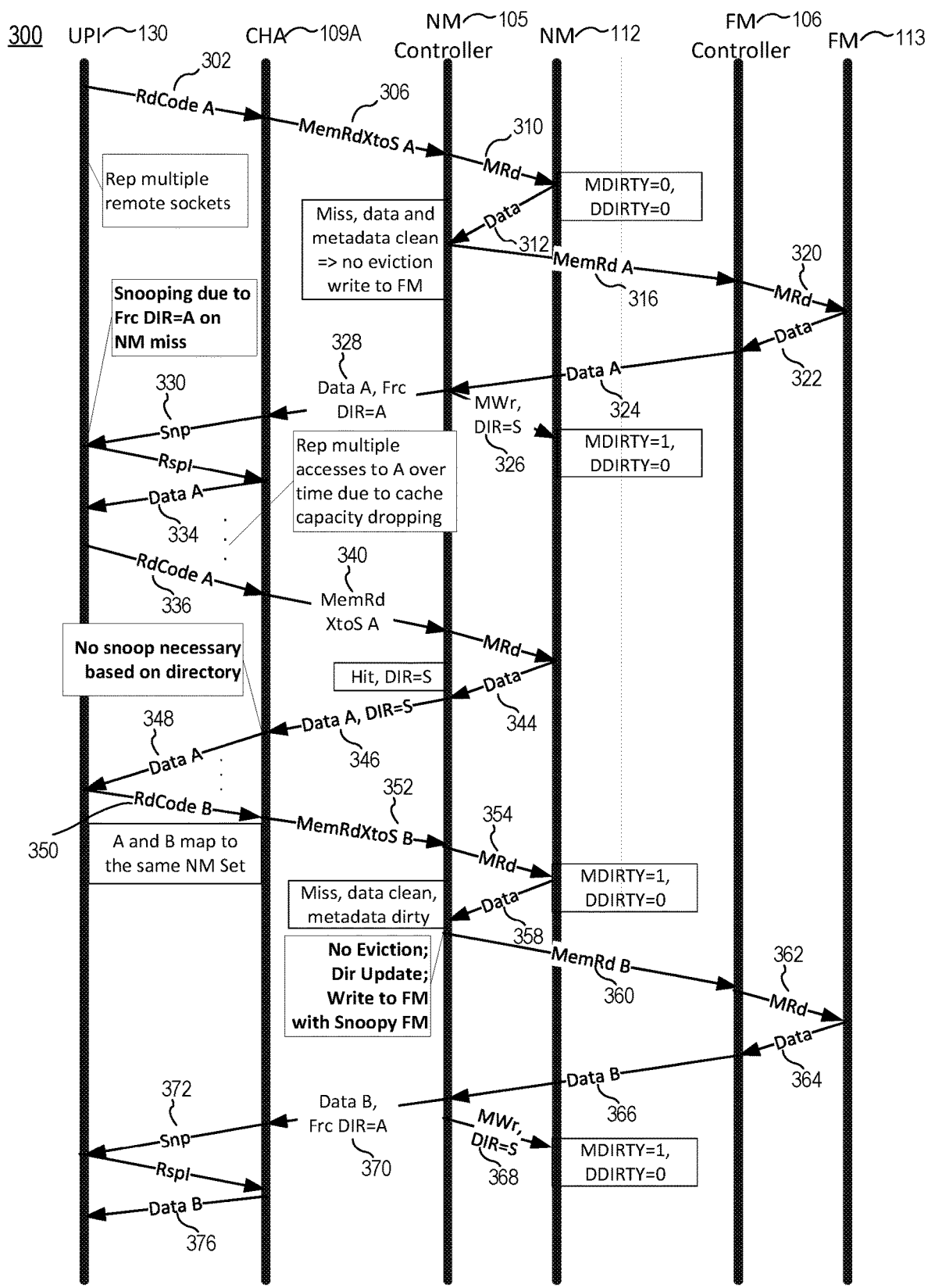
FIG. 3 is a device-based flow diagram that illustrates the hybrid directory and snoopy-based coherency according to an embodiment.

FIG. 3 is a device-based flow diagram 300 that illustrates the hybrid directory and snoopy-based coherency according to an embodiment. The hardware involved includes, from left to right, the external interconnect network 130 (e.g., Ultra-Path Interconnect (UPI)), the CHA 109A, the NM controller 105, the NM 112, the FM controller 106, and the FM 113 (FIG. 1). The diagram 300 is an example merely for purposes of explanation.

In various embodiments, the UPI may send a read code request to read data at address A from a remote socket to the CHA (302), e.g., from one of the multicore processors 110B, 110C, . . . 110N. The CHA may look up, in the local caches of the multicore processor 110A, and miss at the local caches, causing the CHA to send a first memory read operation to the NM controller (306). The MemRdXtoS command tells the NM that the NM should update the directory state at the NM to S since this line is a code read and will not be written to but will likely be read by other sockets. The NM controller reads the NM (310), which misses at the NM for address A, where metadata indicates that the cache line already in NM is clean and can be dropped (312).

In response to the miss at NM, the NM controller may send a second memory operation to the FM controller (316).

The FM controller may then read the data for address A from the FM (320), which is returned in a cache line to the FM controller (322). The FM controller may then send the cache line with the data to the NM controller (324). The NM may then fill the NM with the cache line and data that it received from the FM controller and also update the directory state (DIR) of address A to S (326). The NM controller may also send the cache line with data to the CHA with a forced change to the directory state of the cache line (328) at the CHA, the forced change to cause the CHA to snoop remote sockets in response to a future miss at the near memory for the first memory address. The forced state change (DIR=A) received by the CHA along with the data is to cause the CHA to snoop the remote sockets for the cache line to maintain data coherence for the cache line in the absence of directory state in the far memory (330). In this way, the snoopy mechanism for data retrieved from FM is enforced. Once the snoop responses are received, the data is sent to the requesting remote socket through the UPI port (334). This step may represent multiple accesses to address A overtime due to cache capacity dropping.

From here on, additional read code commands (RdCode A) received from either the local socket or remote socket is to get a NM hit with DIR=S (336), as a result of which there is no need to snoop all the remote sockets before returning data from the NM-DDR. For example, the CHA may send a memory read operation for address A to the NM controller (340), which is then to retrieve the a cache line form the NM in response to a hit for address A in NM (with DIR=S) (344). The cache line with the data is returned to the CHA with directory state of S (346), and may then be forwarded on to a remote socket without need to perform a further snoop based on the directory (348). This is where the hybrid scheme is better than the scheme where both the NM and FM are snoopy. For example, if the NM were also snoopy, then every RdCode A would result in snoops being issued to remote sockets which can saturate the external UPI links and/or any internal interconnect.

At some later point in time, assume the CHA receives a memory read request (RdCode) for Address B from the UPI, which maps to the same NM set as Address A (350). This memory read request comes from a remote socket through the UPI port to the CHA. In response, the CHA may look up its local caches, misses at the local caches, and hence sends another memory read operation (MemRdXtoS for B) to the NM controller (352). The NM controller may then read the NM (354) and gets a miss at NM, with metadata indicating that the cache line already in NM (address A) has metadata bits of MDIRTY=1 and DDIRTY=0 (358), which tells the NM that this line is as good as clean since the FM does not maintain directory. This is where the hybrid scheme is better than the scheme where both the NM and FM enable a directory. If directory is enabled at the FM, then a line with MDIRTY=1 has to be written to FM even if data has not really changed, e.g., DDIRTY=0.

With continued reference to FIG. 3, the NM may send a further memory read operation (MemRd) for Address B to the FM controller to get the data from FM (360). The FM controller may read the FM (362), retrieves a second cache line with data from address B, and sends this second cache line to the NM controller (366). The NM controller may fill the NM with the second cache line with its data that it got from FM controller and also updates the directory state to DIR=S (368). The NM controller also sets the metadata bit MDIRTY=1 and clears the metadata bit DDIRTY=0 to indicate that data is the same as that in the FM, and only the directory bits have been modified. As done with address A, the NM controller may also send, to the CHA, the second cache line and data with a forced change to the directory state for address B to A-state at the CHA (370), as the FM maintains coherence through the snoopy mechanism and the data came directly from the FM. The forced directory state (of DIR=A) received by the CHA along with the data may cause the CHA to snoop the remote sockets on subsequent NM misses for address B (372). Once the snoop responses are received from the CHA, the data may be sent to the requesting remote socket through the UPI port (376).

Figure 4:
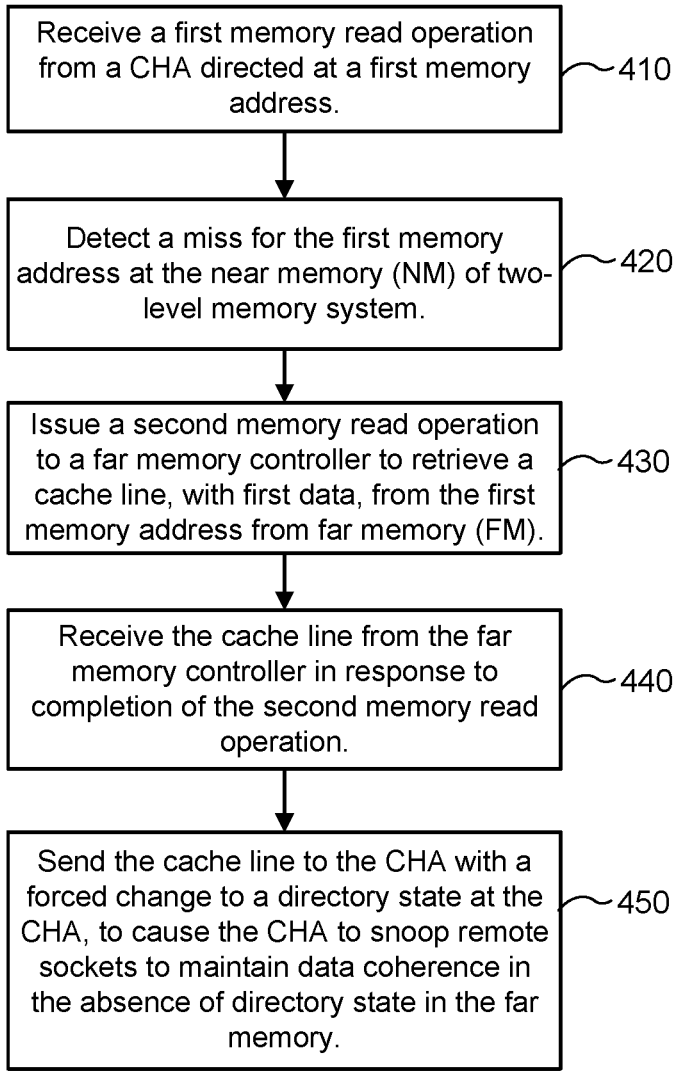
FIG. 4 is a flow chart that illustrates a method for hybrid directory and snoopy-based coherency according to an embodiment.

FIG. 4 is a flow chart that illustrates a method 400 for hybrid directory and snoopy-based coherency according to an embodiment. The method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 400 may be performed, in part, by the NM controller 105 (FIG. 1).

With reference to FIG. 4, the method 400 may begin with the processing logic receiving a first memory read operation from the CHA directed at a first memory address (410). The method 400 may continue with the processing logic detecting a miss for the first memory address at the near memory (420). The method 400 may continue with the processing logic issuing, in response to detection of the miss, a second memory read operation to the far memory controller to retrieve a cache line, comprising first data, from the first memory address of far memory (430). The method 400 may continue with the processing device receiving the cache line from the far memory controller in response to completion of the second memory read operation (440). The method 400 may continue with the processing logic sending the cache line to the CHA with a forced change to the directory state of the cache line at the CHA, the forced change to cause the CHA to snoop the remote sockets for the cache line to maintain data coherence for the cache line (e.g., a more recent copy of the cache line is not present in any remote caches) in the absence of directory state in the far memory (450).

FIG. 5A is a block diagram illustrating a micro-architecture for a processor 500 that implements hybrid directory and snoopy-based coherency, according to an embodiment. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware embodiments, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different scheduler circuits, including reservations stations (RS), central instruction window, etc. The scheduler unit(s) 556 is coupled to the physical register set unit(s) 558. Each of the physical register set units 558 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set unit(s) 558 is overlapped by the retirement unit 554 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register set unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register set unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processor 500 of FIG. 5A according to some embodiments of the disclosure. The solid lined boxes in FIG. 5B illustrate an in-order pipeline 501, while the dashed lined boxes illustrate a register renaming, out-of-order issue/execution pipeline 503. In FIG. 5B, the pipelines 501 and 503 include a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 520, and a commit stage 522. In some embodiments, the ordering of stages 502-524 may be different than illustrated and are not limited to the specific ordering shown in FIG. 5B.

Figure 6:
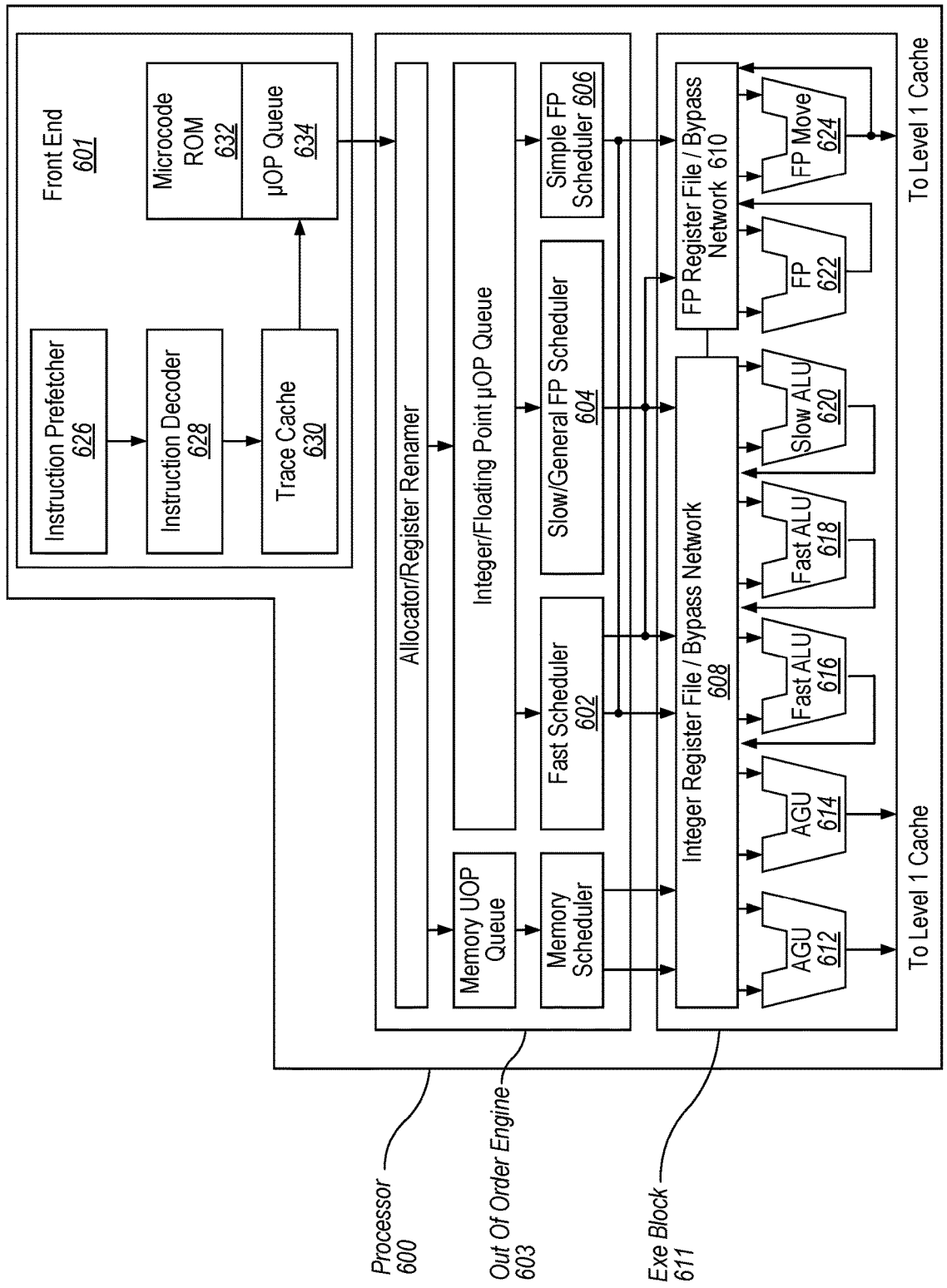
FIG. 6 illustrates a block diagram of the micro-architecture for a processor or an integrated circuit that implements hybrid directory and snoopy-based coherency, according to an embodiment of the disclosure.

FIG. 6 illustrates a block diagram of the micro-architecture for a processor 600 that includes logic circuits of a processor or an integrated circuit that implements hybrid directory and snoopy-based coherency, according to an embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline. The embodiments of the page additions and content copying can be implemented in processor 600.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, microcode ROM (or RAM) 632 provides the uops needed to complete the operation.

Some instructions are converted into a single micro-op, whereas others need several micro-ops to complete the full operation. In one embodiment, if more than four micro-ops are needed to complete an instruction, the instruction decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and reorder the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register sets 608, 610, sit between the schedulers 602, 604, 606, and the execution units 612, 614, 616, 618, 620, 622, 624 in the execution block 611. There is a separate register set 608, 610, for integer and floating point operations, respectively. Each register set 608, 610, of one embodiment also includes a bypass network that can bypass or forward just completed results that have not yet been written into the register set to new dependent uops. The integer register set 608 and the floating point register set 610 are also capable of communicating data with the other. For one embodiment, the integer register set 608 is split into two separate register sets, one register set for the low order 32 bits of data and a second register set for the high order 32 bits of data. The floating point register set 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register sets 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 612, floating point move unit 614. For one embodiment, the floating point execution blocks 612, 614, execute floating point, MMX, SIMD, and SSE, or other operations. The floating point ALU 612 of one embodiment includes a 64 bit by 64 bit floating point divider to execute divide, square root, and remainder micro-ops. For embodiments of the disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 622, 624. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 7:
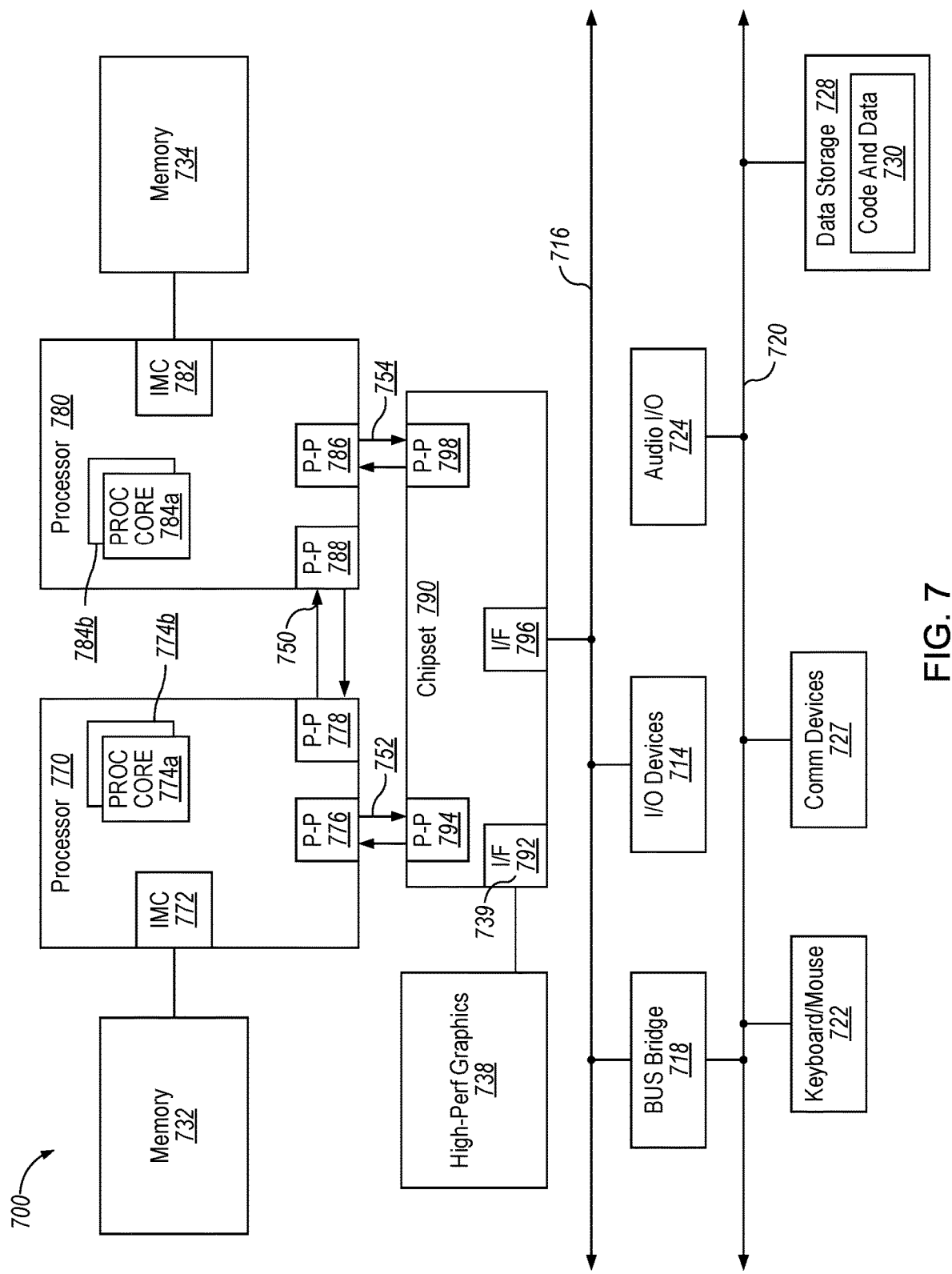
FIG. 7 is a block diagram of a computer system according to one embodiment.

Implementations may be implemented in many different system types. Referring now to FIG. 7, shown is a block diagram of a multiprocessor system 700 that may implement hardware support for hybrid directory and snoopy-based coherency, in accordance with an embodiment. As shown in FIG. 7, multiprocessor system 700 is a point-to-point interconnect system, and includes a first processor 770 and a second processor 780 coupled via a point-to-point interconnect 750. As shown in FIG. 7, each of processors 770 and 780 may be multicore processors, including first and second processor cores (i.e., processor cores 774a and 774b and processor cores 784a and 784b), although potentially many more cores may be present in the processors. While shown with two processors 770, 780, it is to be understood that the scope of the disclosure is not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788.

Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may exchange information with a chipset 790 via individual P-P interfaces 752, 754 using point to point interface circuits 776, 794, 786, 798. Chipset 790 may also exchange information with a high-performance graphics circuit 738 via a high-performance graphics interface 792.

Chipset 790 may be coupled to a first bus 716 via an interface 796. In one embodiment, first bus 716 may be a Peripheral Component Interconnect (PCI) bus, or a bus such as a PCI Express bus or interconnect bus, although the scope of the disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
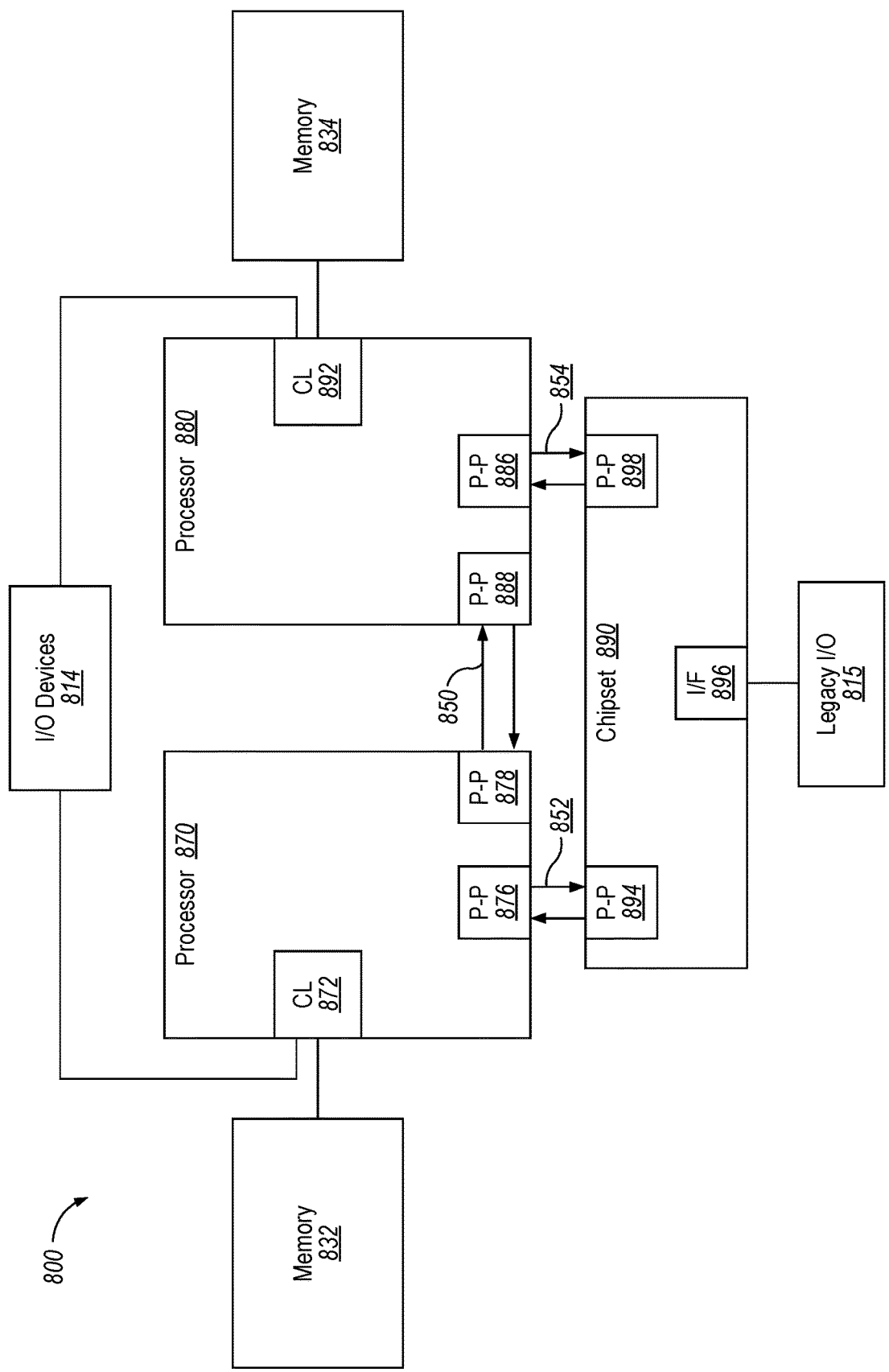
FIG. 8 is a block diagram of a computer system according to another embodiment.

Referring now to FIG. 8, shown is a block diagram of a third system 800 that may implement hardware support for hybrid directory and snoopy-based coherency, in accordance with an embodiment of the disclosure. Like elements in FIGS. 7 and 8 bear like reference numerals and certain aspects of FIG. 8 have been omitted from FIG. 7 in order to avoid obscuring other aspects of FIG. 8.

FIG. 8 illustrates processors 870, 880. In one embodiment, processors 870, 880 may implement hybrid cores as described above. Processors 870, 880 may include integrated memory and I/O control logic ("CL") 872 and 892, respectively, and intercommunicate with each other via point-to-point interconnect 850 between point-to-point (P-P) interfaces 878 and 888 respectively. Processors 870, 880 each communicate with chipset 890 via point-to-point interconnects 852 and 854 through the respective P-P interfaces 876 to 894 and 886 to 898 as shown. For at least one embodiment, the CL 872, 882 may include integrated memory controller units such as described herein. In addition, CL 872, 892 may also include I/O control logic. FIG. 8 illustrates that the memories 832, 834 are coupled to the CL 872, 892, and that I/O devices 814 are also coupled to the control logic 872, 892. Legacy I/O devices 815 are coupled to the chipset 890 via interface 896.

Figure 9:
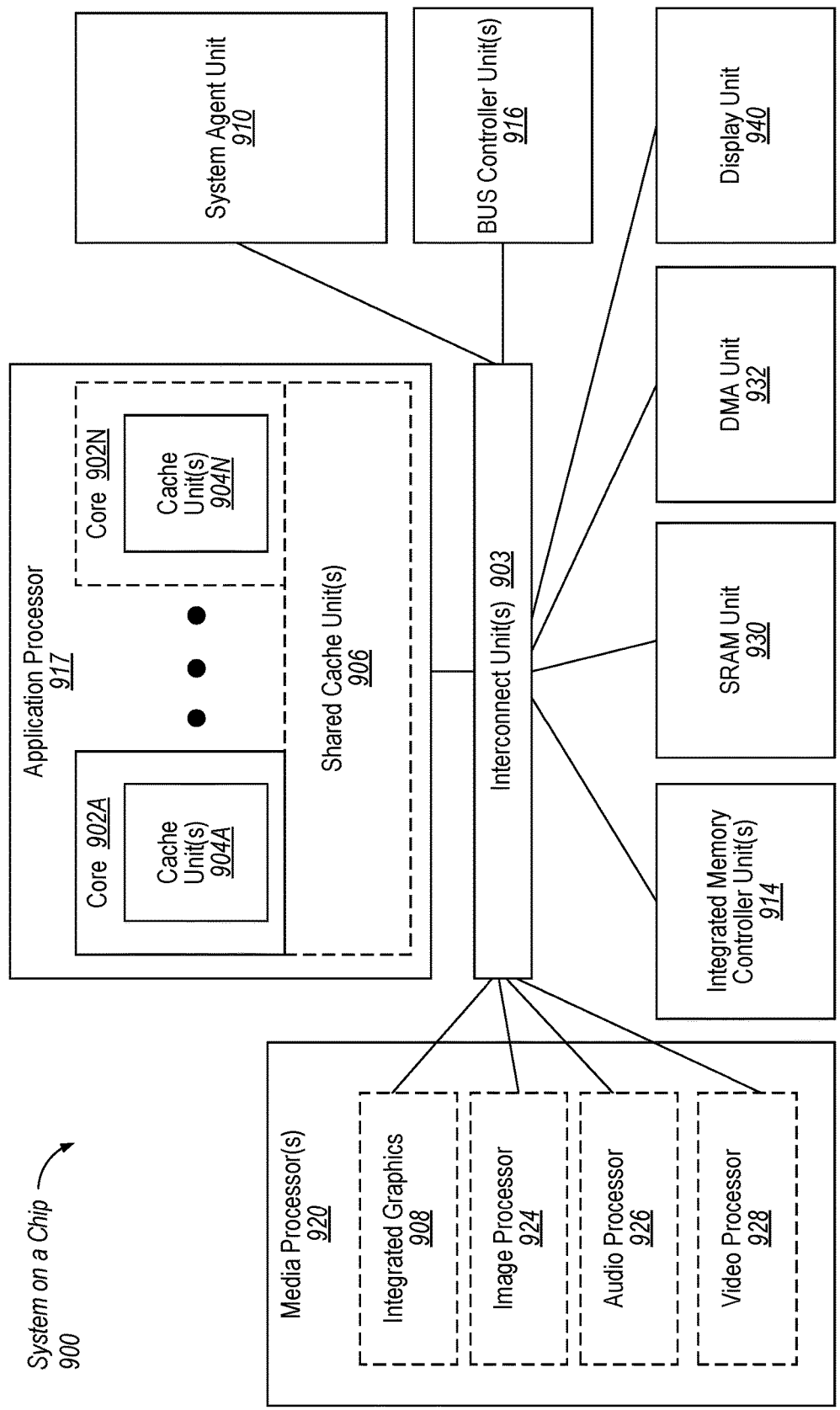
FIG. 9 is a block diagram of a system on a chip according to one embodiment.

FIG. 9 is an exemplary system on a chip (SoC) 900 that may include one or more of the cores 902A . . . 902N that may implement hardware support for hybrid directory and snoopy-based coherency. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 900 of FIG. 9, dashed lined boxes are features on more advanced SoCs. An interconnect unit(s) 903 may be coupled to: an application processor 917 which includes a set of one or more cores 902A-N, containing one or more cache unit(s) 904A . . . 904N, respectively, and shared cache unit(s) 906; a system agent unit 910; a bus controller unit(s) 916; an integrated memory controller unit(s) 914; a set of one or more media processors 920 which may include integrated graphics logic 908, an image processor 924 for providing still and/or video camera functionality, an audio processor 926 for providing hardware audio acceleration, and a video processor 928 for providing video encode/decode acceleration; a static random access memory (SRAM) unit 930; a direct memory access (DMA) unit 932; and a display unit 940 for coupling to one or more external displays.

Figure 10:
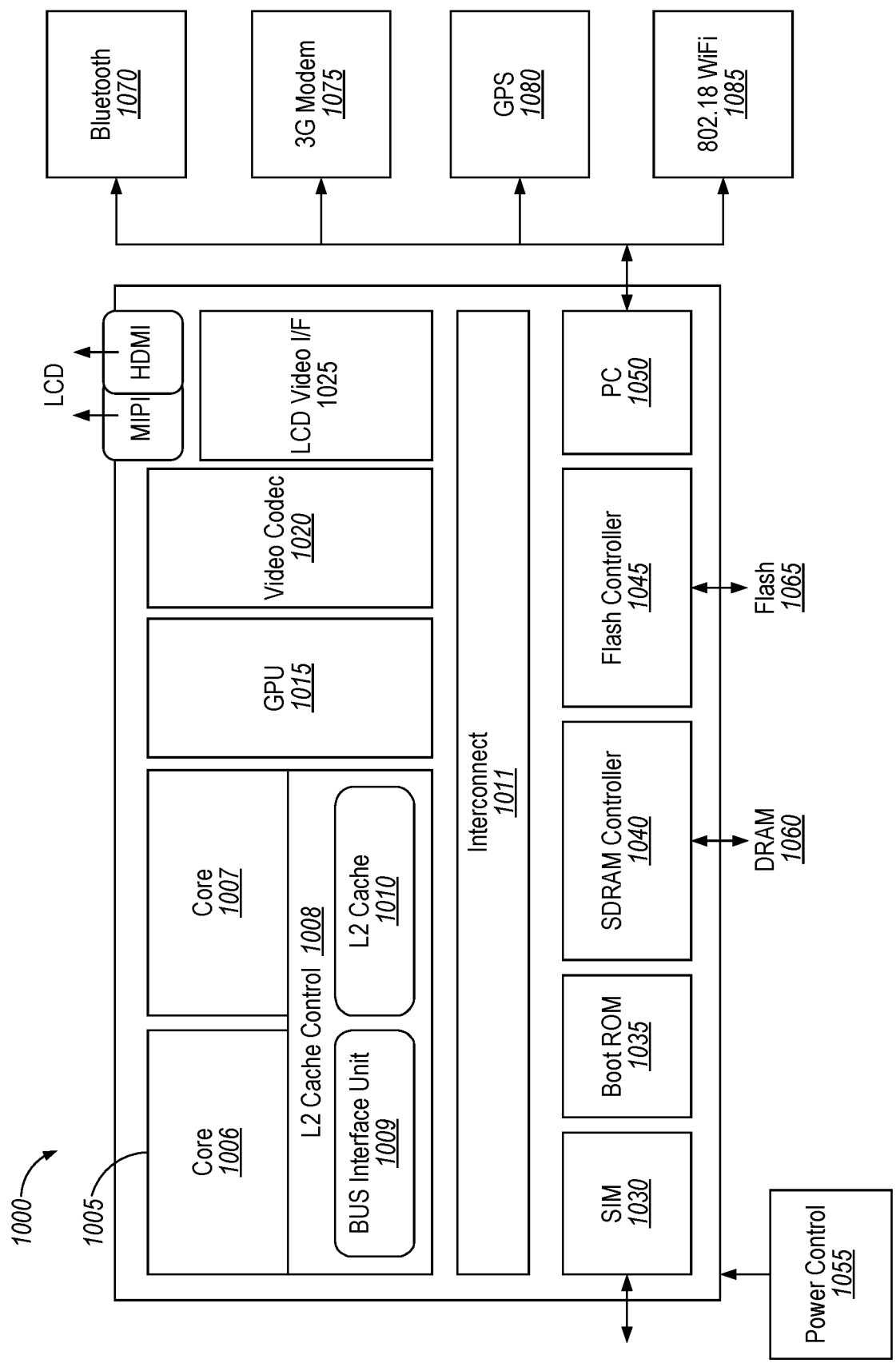
FIG. 10 illustrates another embodiment of a block diagram for a computing system.

Turning next to FIG. 10, an embodiment of a system on-chip (SoC) design that may implement hardware support for hybrid directory and snoopy-based coherency, in accordance with embodiments of the disclosure is depicted. As an illustrative example, SoC 1000 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1000.

Here, SoC 1000 includes 2 cores—1006 and 1007. Similar to the discussion above, cores 1006 and 1007 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1006 and 1007 are coupled to cache control 1008 that is associated with bus interface unit 1009 and L2 cache 1010 to communicate with other parts of system 1000. Interconnect 1011 includes an on-chip interconnect, such as an IOSF, AMBA, or other interconnects discussed above, which can implement one or more aspects of the described disclosure.

In one embodiment, SDRAM controller 1040 may connect to interconnect 1011 via cache 1010. Interconnect 1011 provides communication channels to the other components, such as a Subscriber Identity Module (SIM) 1030 to interface with a SIM card, a boot ROM 1035 to hold boot code for execution by cores 1006 and 1007 to initialize and boot SoC 1000, a SDRAM controller 1040 to interface with external memory (e.g. DRAM 1060), a flash controller 1045 to interface with non-volatile memory (e.g. Flash 1065), a peripheral control 1050 (e.g. Serial Peripheral Interface) to interface with peripherals, video codecs 1020 and Video interface 1025 to display and receive input (e.g. touch enabled input), GPU 1015 to perform graphics related computations, etc. Any of these interfaces may incorporate aspects of the embodiments described herein.

In addition, the system illustrates peripherals for communication, such as a power control module 1055, a Bluetooth® module 1070, 3G modem 1075, GPS 1080, and Wi-Fi® 1085. Note as stated above, a UE includes a radio for communication. As a result, these peripheral communication modules may not all be included. However, in a UE some form of a radio for external communication should be included.

Figure 11:
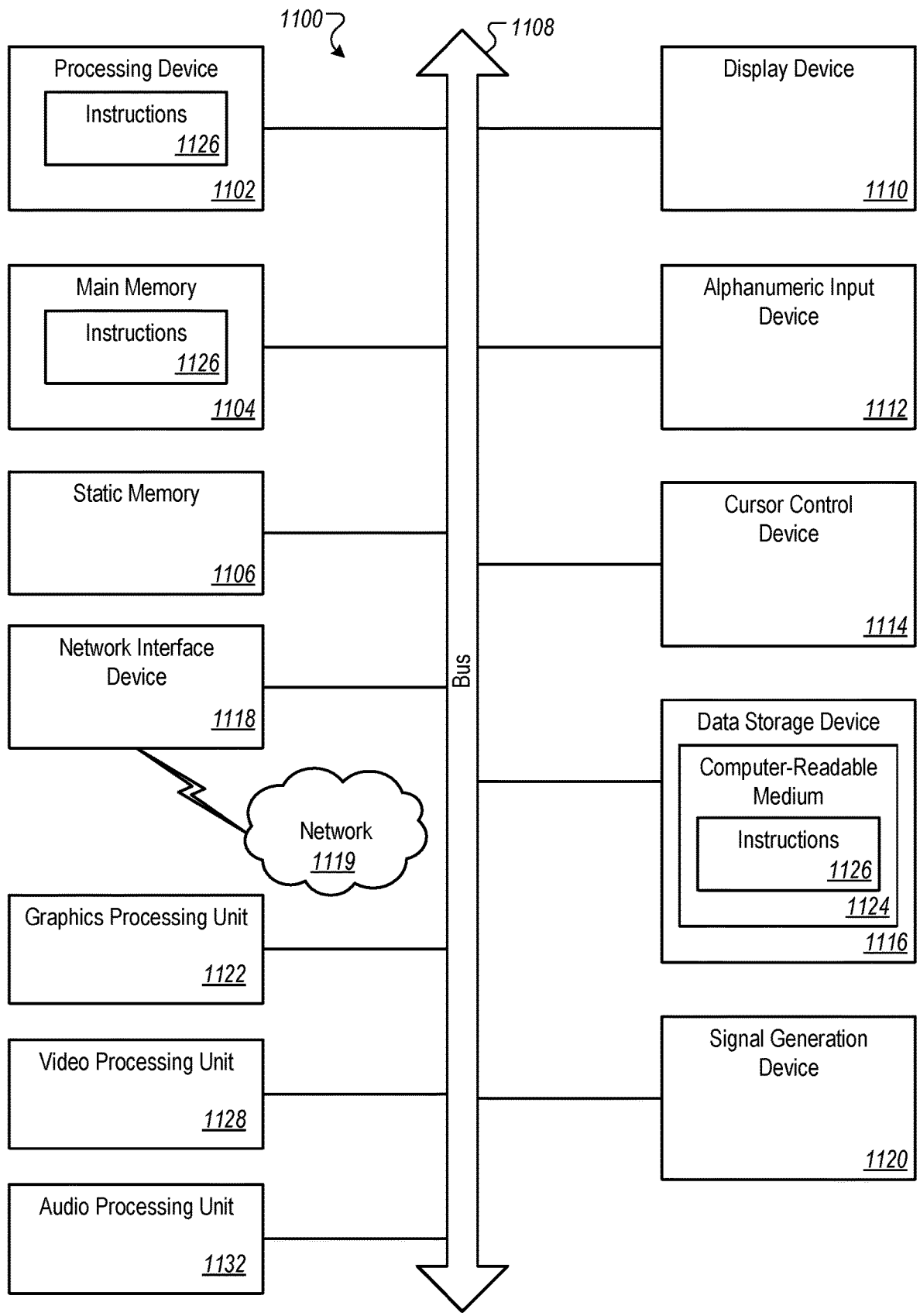
FIG. 11 illustrates another embodiment of a block diagram for a computing system.

FIG. 11 illustrates a diagrammatic representation of a machine in the example form of a computing system 1100 within which a set of instructions, for causing the machine to implement hardware support for hybrid directory and snoopy-based coherency according any one or more of the methodologies discussed herein. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1100.

The computing system 1100 includes a processing device 1102, main memory 1104 (e.g., flash memory, dynamic random access memory (DRAM) (such as synchronous DRAM (SDRAM) or DRAM (RDRAM), etc.), a static memory 1106 (e.g., flash memory, static random access memory (SRAM), etc.), and a data storage device 1116, which communicate with each other via a bus 1108.

Processing device 1102 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1102 may also be one or more special-purpose processing devices such as an application-specific integrated circuit (ASIC), a field programmable gate array (FPGA), a digital signal processor (DSP), network processor, or the like. In one embodiment, processing device 1102 may include one or more processor cores. The processing device 1102 is configured to execute the processing logic 1126 for performing the operations discussed herein.

In one embodiment, processing device 1102 can be part of a processor or an integrated circuit that includes the disclosed LLC caching architecture. Alternatively, the computing system 1100 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1100 may further include a network interface device 1118 communicably coupled to a network 1119. The computing system 1100 also may include a video display device 1110 (e.g., a liquid crystal display (LCD) or a cathode ray tube (CRT)), an alphanumeric input device 1112 (e.g., a keyboard), a cursor control device 1114 (e.g., a mouse), a signal generation device 1120 (e.g., a speaker), or other peripheral devices. Furthermore, computing system 1100 may include a graphics processing unit 1122, a video processing unit 1128 and an audio processing unit 1132. In another embodiment, the computing system 1100 may include a chipset (not illustrated), which refers to a group of integrated circuits, or chips, that are designed to work with the processing device 1102 and controls communications between the processing device 1102 and external devices. For example, the chipset may be a set of chips on a motherboard that links the processing device 1102 to very high-speed devices, such as main memory 1104 and graphic controllers, as well as linking the processing device 1102 to lower-speed peripheral buses of peripherals, such as USB, PCI or ISA buses.

The data storage device 1116 may include a computer-readable storage medium 1124 on which is stored software 1126 embodying any one or more of the methodologies of functions described herein. The software 1126 may also reside, completely or at least partially, within the main memory 1104 as instructions 1126 and/or within the processing device 1102 as processing logic during execution thereof by the computing system 1100; the main memory 1104 and the processing device 1102 also constituting computer-readable storage media.

The computer-readable storage medium 1124 may also be used to store instructions 1126 utilizing the processing device 1102, and/or a software library containing methods that call the above applications. While the computer-readable storage medium 1124 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the disclosed embodiments. The term "computer-readable storage medium" shall accordingly be taken to include, but not be limited to, solid-state memories, and optical and magnetic media.

The following examples pertain to further embodiments.

Example 1 is processor comprising: 1) one or more cores, each comprising cache; 2) a cache home agent (CHA) coupled to the cache; and 3) a near memory controller coupled to the CHA, to near memory, and to a far memory controller, wherein the near memory controller is to: a) receive a first memory read operation from the CHA directed at a first memory address; b) detect a miss for the first memory address at the near memory; c) issue, in response to detection of the miss, a second memory read operation to the far memory controller to retrieve a cache line, comprising first data, from the first memory address of far memory; d) receive the cache line from the far memory controller in response to completion of the second memory read operation; and e) send the cache line to the CHA with a forced change to a directory state of the cache line at the CHA, the forced change to cause the CHA to snoop remote sockets to maintain data coherence for the cache line in an absence of directory state in the far memory.

In Example 2, the processor of Example 1, further comprising the far memory controller to: a) retrieve the cache line from the far memory in response to the second memory read operation; and b) send the cache line to the near memory controller.

In Example 3, the processor of Example 1, wherein the directory state comprises an "any" (A) state, and wherein the CHA is to snoop the remote sockets of a multi-socket system for the cache line to maintain data coherence for the cache line in the absence of directory state in the far memory.

In Example 4, the processor of Example 1, wherein the near memory controller is further to: a) write the cache line to the near memory; and b) update directory bits in the cache line to a directory state consistent with a read opcode of the first memory read operation.

In Example 5, the processor of Example 4, wherein the cache line written to the near memory further comprises a pair of metadata bits comprising: 1) a first bit to indicate whether the first data in the cache line is dirty; and 2) a second bit to indicate whether the directory bits are dirty.

In Example 6, the processor of Example 5, wherein, to evict the cache line, the near memory controller is further to: a) determine that the first bit of the pair of metadata bits indicates that the first data is clean; and b) not issue a memory write operation to write the first data back to the far memory.

In Example 7, the processor of Example 5, wherein the near memory controller is further to: a) receive a memory write operation from the CHA directed to the first memory address; b) determine whether the memory write operation is a directory-only write or includes a data write; and c) in response to being a directory-only write, set the second bit, but not the first bit, of the pair of metadata bits, which avoids a write-back to the far memory.

In Example 8, the processor of Example 7, wherein, to determine that the memory write operation is the directory-only write, the near memory controller is to determine that an update to the directory bits is necessary based on a current directory state read from the near memory and on an opcode received in the first memory read operation, and wherein the near memory controller is further to clear the second bit of the pair of metadata bits to indicate the first data is clean.

In Example 9, the processor of Example 7, wherein, to determine that the memory write operation is the directory-only write, the near memory controller is to receive a direct indication of the directory-only write in the memory write operation from the CHA, wherein the direct indication is based in part on a previous indication received by the CHA from the near memory controller, in response to the first memory read operation, that the first bit indicated the first data was clean.

Various embodiments may have different combinations of the structural features described above. For instance, all optional features of the processors and methods described above may also be implemented with respect to a system described herein and specifics in the examples may be used anywhere in one or more embodiments.

Example 10 is a method comprising: 1) receiving, by a near memory controller of a processing system, a first memory read operation from a cache home agent (CHA) directed at a first memory address; 2) detecting, by the near memory controller, a miss for the first memory address at near memory of a two-level memory system; 3) issuing, by the near memory controller in response to detection of the miss, a second memory read operation to a far memory controller to retrieve a cache line, comprising first data, from the first memory address of far memory; 4) receiving, by the near memory controller, the cache line from the far memory controller in response to completion of the second memory read operation; and 5) sending, by the near memory controller, the cache line to the CHA with a forced change to a directory state of the cache line at the CHA, the forced change to cause the CHA to snoop remote sockets to maintain data coherence for the cache line in an absence of directory state in the far memory.

In Example 11, the method of Example 10, wherein the directory state comprises an "any" (A) state, the method further comprising: 1) retrieving, by the far memory controller, the cache line from the far memory in response to the second memory read operation; 2) sending, by the far memory controller, the cache line to the near memory controller; and 3) snooping, by the CHA, the remote sockets of a multi-socket system for the cache line to maintain data coherence for the cache line in the absence of directory state in the far memory.

In Example 12, the method of Example 10, further comprising: 1) writing, by the near memory controller, the cache line to the near memory; and 2) updating, by the near memory controller, directory bits in the cache line to a directory state consistent with a read opcode of the first memory read operation.

In Example 13, the method of Example 12, wherein the cache line written to the near memory further comprises a pair of metadata bits comprising: 1) a first bit to indicate whether the first data in the cache line is dirty; and 2) a second bit to indicate whether the directory bits are dirty.

In Example 14, the method of Example 13, further comprising evicting the cache line, wherein evicting comprises: 1) determining, by the near memory controller, that the first bit of the pair of metadata bits indicates that the first data is clean; and 2) not issuing, by the near memory controller, a memory write operation to write the first data back to the far memory.

In Example 15, the method of Example 13, further comprising: 1) receiving, by the near memory controller, a memory write operation from the CHA directed to the first memory address; 2) determining, by the near memory controller, whether the memory write operation is a directory-only write or includes a data write; and 3) in response to being a directory-only write, setting, by the near memory controller, the second bit, but not the first bit, of the pair of metadata bits, which avoids a write-back to the far memory.

In Example 16, the method of Example 15, wherein determining that the memory write operation is the directory-only write comprises determining, by the near memory controller, that an update to the directory bits is necessary based on a current directory state read from the near memory and on an opcode received in the first memory read operation, the method further comprising clearing, by the near memory controller, the second bit of the pair of metadata bits to indicate the first data is clean.

In Example 17, the method of Example 15, wherein determining that the memory write operation is the directory-only write comprises receiving, by the near memory controller, a direct indication of the directory-only write in the memory write operation from the CHA, the direct indication being based in part on a previous indication received by the CHA from the near memory controller, in response to the first memory read operation, that the first bit indicated the first data was clean.

Various embodiments may have different combinations of the structural features described above. For instance, all optional features of the processors and methods described above may also be implemented with respect to a system described herein and specifics in the examples may be used anywhere in one or more embodiments.

Example 18 is a multi-socket system comprising: 1) system memory comprising near memory and far memory; and 2) a socket coupled to the system memory, the socket comprising: a) one or more cores, each having cache; b) a cache home agent (CHA) coupled to the cache; d) a far memory controller coupled to the far memory; and e) a near memory controller coupled to the CHA, to the near memory, and to the far memory controller, wherein the near memory controller is to: i) receive a first memory read operation from the CHA directed at a first memory address; ii) detect a miss for the first memory address at the near memory; iii) issue, in response to detection of the miss, a second memory read operation to the far memory controller to retrieve a cache line, comprising first data, from the first memory address of the far memory; iv) receive the cache line from the far memory controller in response to completion of the second memory read operation; and v) send the cache line to the CHA with a forced change to a directory state of the cache line at the CHA, the forced change to cause the CHA to snoop remote sockets to maintain data coherence for the cache line in an absence of directory state in the far memory.

In Example 19, the multi-socket system of Example 18, wherein the far memory controller is to: i) retrieve the cache line from the far memory in response to the second memory read operation; and ii) send the cache line to the near memory controller.

In Example 20, the multi-socket system of Example 18, wherein the directory state comprises an "any" (A) state, and wherein the CHA is to snoop the remote sockets of a multi-socket system for the cache line to maintain data coherence for the cache line in the absence of directory state in the far memory.

In Example 21, the multi-socket system of Example 18, wherein the near memory controller is further to: i) write the cache line to the near memory; and ii) update directory bits in the cache line to a directory state consistent with a read opcode of the first memory read operation.

In Example 22, the multi-socket system of Example 21, wherein the cache line written to the near memory further comprises a pair of metadata bits comprising: 1) a first bit to indicate whether the first data in the cache line is dirty; and 2) a second bit to indicate whether the directory bits are dirty.

In Example 23, the multi-socket system of Example 22, wherein, to evict the cache line, the near memory controller is further to: i) determine that the first bit of the pair of metadata bits indicates that the first data is clean; and ii) not issue a memory write operation to write the first data back to the far memory.

In Example 24, the multi-socket system of Example 22, wherein the near memory controller is further to: i) receive a memory write operation from the CHA directed to the first memory address; ii) determine whether the memory write operation is a directory-only write or includes a data write; and iii) in response to being a directory-only write, set the second bit, but not the first bit, of the pair of metadata bits, which avoids a write-back to the far memory.

Various embodiments may have different combinations of the structural features described above. For instance, all optional features of the processors and methods described above may also be implemented with respect to a system described herein and specifics in the examples may be used anywhere in one or more embodiments.

Example 25 is a non-transitory computer readable medium storing instructions, which when executed by a processor, cause the processor to perform a plurality of operations comprising: 1) receiving, by a near memory controller of a processing system, a first memory read operation from a cache home agent (CHA) directed at a first memory address; 2) detecting, by the near memory controller, a miss for the first memory address at near memory of a two-level memory system; 3) issuing, by the near memory controller in response to detection of the miss, a second memory read operation to a far memory controller to retrieve a cache line, comprising first data, from the first memory address of far memory; 4) receiving, by the near memory controller, the cache line from the far memory controller in response to completion of the second memory read operation; and 5) sending, by the near memory controller, the cache line to the CHA with a forced change to a directory state of the cache line at the CHA, the forced change to cause the CHA to snoop remote sockets to maintain data coherence for the cache line in an absence of directory state in the far memory.

In Example 26, the non-transitory computer readable medium of Example 25, wherein the directory state comprises an "any" (A) state, the plurality of operations further comprising: 1) retrieving, by the far memory controller, the cache line from the far memory in response to the second memory read operation; 2) sending, by the far memory controller, the cache line to the near memory controller; and 3) snooping, by the CHA, the remote sockets of a multi-socket system for the cache line to maintain data coherence for the cache line in the absence of directory state in the far memory.

In Example 27, the non-transitory computer readable medium of Example 25, further comprising: 1) writing, by the near memory controller, the cache line to the near memory; and 2) updating, by the near memory controller, directory bits in the cache line to a directory state consistent with a read opcode of the first memory read operation.

In Example 28, the non-transitory computer readable medium of Example 27, wherein the cache line written to the near memory further comprises a pair of metadata bits comprising: 1) a first bit to indicate whether the first data in the cache line is dirty; and 2) a second bit to indicate whether the directory bits are dirty.

In Example 29, the non-transitory computer readable medium of Example 28, further comprising evicting the cache line, wherein evicting comprises: 1) determining, by the near memory controller, that the first bit of the pair of metadata bits indicates that the first data is clean; and 2) not issuing, by the near memory controller, a memory write operation to write the first data back to the far memory.

In Example 30, the non-transitory computer readable medium of Example 28, the plurality of operations further comprising: 1) receiving, by the near memory controller, a memory write operation from the CHA directed to the first memory address; 2) determining, by the near memory controller, whether the memory write operation is a directory-only write or includes a data write; and 3) in response to being a directory-only write, setting, by the near memory controller, the second bit, but not the first bit, of the pair of metadata bits, which avoids a write-back to the far memory.

In Example 31, the non-transitory computer readable medium of Example 30, wherein determining that the memory write operation is the directory-only write comprises determining, by the near memory controller, that an update to the directory bits is necessary based on a current directory state read from the near memory and on an opcode received in the first memory read operation, the plurality of operations further comprising clearing, by the near memory controller, the second bit of the pair of metadata bits to indicate the first data is clean.

In Example 32, the non-transitory computer readable medium of 30, wherein determining that the memory write operation is the directory-only write comprises receiving, by the near memory controller, a direct indication of the directory-only write in the memory write operation from the CHA, the direct indication being based in part on a previous indication received by the CHA from the near memory controller, in response to the first memory read operation, that the first bit indicated the first data was clean.

Various embodiments may have different combinations of the structural features described above. For instance, all optional features of the processors and methods described above may also be implemented with respect to a system described herein and specifics in the examples may be used anywhere in one or more embodiments.

Example 33 is a multi-socket system comprising: 1) means for receiving, by a near memory controller of a processing system, a first memory read operation from a cache home agent (CHA) directed at a first memory address; 2) means for detecting, by the near memory controller, a miss for the first memory address at near memory of a two-level memory system; 3) means for issuing, by the near memory controller in response to detection of the miss, a second memory read operation to a far memory controller to retrieve a cache line, comprising first data, from the first memory address of far memory; 4) means for receiving, by the near memory controller, the cache line from the far memory controller in response to completion of the second memory read operation; and 5) means for sending, by the near memory controller, the cache line to the CHA with a forced change to a directory state of the cache line at the CHA, the forced change to cause the CHA to snoop remote sockets to maintain data coherence for the cache line in an absence of directory state in the far memory.

In Example 34, the multi-socket system of Example 33, wherein the directory state comprises an "any" (A) state, further comprising: 1) means for retrieving, by the far memory controller, the cache line from the far memory in response to the second memory read operation; 2) means for sending, by the far memory controller, the cache line to the near memory controller; and 3) means for snooping, by the CHA, the remote sockets of a multi-socket system for the cache line to maintain data coherence for the cache line in the absence of directory state in the far memory.

In Example 35, the multi-socket system of Example 33, further comprising: 1) means for writing, by the near memory controller, the cache line to the near memory; and 2) means for updating, by the near memory controller, directory bits in the cache line to a directory state consistent with a read opcode of the first memory read operation.

In Example 36, the multi-socket system of Example 35, wherein the cache line written to the near memory further comprises a pair of metadata bits comprising: 1) a first bit to indicate whether the first data in the cache line is dirty; and 2) a second bit to indicate whether the directory bits are dirty.

In Example 37, the multi-socket system of Example 36, further comprising means for evicting the cache line, wherein the means for evicting comprises: 1) means for determining, by the near memory controller, that the first bit of the pair of metadata bits indicates that the first data is clean; and 2) means for not issuing, by the near memory controller, a memory write operation to write the first data back to the far memory.

In Example 38, the multi-socket system of Example 36, further comprising: 1) means for receiving, by the near memory controller, a memory write operation from the CHA directed to the first memory address; 2) means for determining, by the near memory controller, whether the memory write operation is a directory-only write or includes a data write; and 3) in response to being a directory-only write, means for setting, by the near memory controller, the second bit, but not the first bit, of the pair of metadata bits, which avoids a write-back to the far memory.

In Example 39, the multi-socket system of Example 38, wherein the means for determining that the memory write operation is the directory-only write comprises means for determining, by the near memory controller, that an update to the directory bits is necessary based on a current directory state read from the near memory and on an opcode received in the first memory read operation, further comprising means for clearing, by the near memory controller, the second bit of the pair of metadata bits to indicate the first data is clean.

In Example 40, the multi-socket system of Example 38, wherein means for determining that the memory write operation is the directory-only write comprises means for receiving, by the near memory controller, a direct indication of the directory-only write in the memory write operation from the CHA, the direct indication being based in part on a previous indication received by the CHA from the near memory controller, in response to the first memory read operation, that the first bit indicated the first data was clean.

While the disclosure has been described with respect to a limited number of embodiments, those skilled in the art will appreciate numerous modifications and variations therefrom. It is intended that the appended claims cover all such modifications and variations as fall within the true spirit and scope of this disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the disclosure. It will be apparent, however, to one skilled in the art that these specific details need not be employed to practice the disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler embodiments, specific expression of algorithms in code, specific power down and gating techniques/logic and other specific operational details of a computer system have not been described in detail in order to avoid unnecessarily obscuring the disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the disclosure rather than to provide an exhaustive list of all possible embodiments of embodiments of the disclosure.

Although the above examples describe instruction handling and distribution in the context of execution units and logic circuits, other embodiments of the disclosure can be accomplished by way of a data or instructions stored on a machine-readable, tangible medium, which when performed by a machine cause the machine to perform functions consistent with at least one embodiment of the disclosure. In one embodiment, functions associated with embodiments of the disclosure are embodied in machine-executable instructions. The instructions can be used to cause a general-purpose or special-purpose processor that is programmed with the instructions to perform the steps of the disclosure. Implementations of the disclosure may be provided as a computer program product or software which may include a machine or computer-readable medium having stored thereon instructions which may be used to program a computer (or other electronic devices) to perform one or more operations according to embodiments of the disclosure. Alternatively, operations of embodiments of the disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the disclosure.

A module as used herein refers to any combination of hardware, software, and/or firmware. As an example, a module includes hardware, such as a microcontroller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising: one or more cores, each comprising cache; a cache home agent (CHA) coupled to the cache; and a near memory controller coupled to the CHA, to near memory, and to a far memory controller, wherein the near memory controller is to: receive a first memory read operation from the CHA directed at a memory address; detect a miss for the memory address at the near memory; issue, in response to detection of the miss, a second memory read operation to the far memory controller to retrieve a cache line, comprising first data, from the memory address of far memory; receive the cache line from the far memory controller in response to completion of the second memory read operation; and in response to the cache line being retrieved from the far memory, send the cache line to the CHA with a change to a directory state of the cache line at the CHA, the changed directory state to cause the CHA to snoop remote sockets to maintain data coherence for the cache line, and write the cache line to the near memory with a set of metadata bits indicating that the cache line is clean and directory bits in the cache line are dirty, wherein based on the set of metadata bits, the cache line is not written to the far memory in response to the cache line being selected to be evicted from the near memory, wherein the near memory maintains the data coherence using directory state in an absence of directory state in the far memory.

2. The processor of claim 1, further comprising the far memory controller to:
retrieve the cache line from the far memory in response to the second memory read operation; and
send the cache line to the near memory controller.

3. The processor of claim 1, wherein the changed directory state comprises an "any" (A) state, and wherein the CHA is to snoop the remote sockets for the cache line to maintain data coherence for the cache line.

4. The processor of claim 1, wherein the near memory controller is further to:
update the directory bits in the cache line to a directory state consistent with a read opcode of the first memory read operation.

5. The processor of claim 4, wherein the cache line written to the near memory further comprises the set of metadata bits comprising:
a first bit to indicate whether the first data in the cache line is dirty; and
a second bit to indicate whether the directory bits are dirty.

6. The processor of claim 5, wherein, to evict the cache line, the near memory controller is further to:
determine that the first bit of the set of metadata bits indicates that the first data is clean; and
not issue a memory write operation to write the first data back to the far memory.

7. The processor of claim 5, wherein the near memory controller is further to:
receive a memory write operation from the CHA directed to the memory address;
determine whether the memory write operation is a directory-only write or includes a data write; and
in response to being a directory-only write, set the second bit, but not the first bit, of the set of metadata bits, which avoids a write-back to the far memory.

8. The processor of claim 7, wherein, to determine that the memory write operation is the directory-only write, the near memory controller is to determine that an update to the directory bits is necessary based on a current directory state read from the near memory and on an opcode received in the first memory read operation, and wherein the near memory controller is further to clear the second bit of the set of metadata bits to indicate the first data is clean.

9. The processor of claim 7, wherein, to determine that the memory write operation is the directory-only write, the near memory controller is to receive a direct indication of the directory-only write in the memory write operation from the CHA, wherein the direct indication is based in part on a previous indication received by the CHA from the near memory controller, in response to the first memory read operation, that the first bit indicated the first data was clean.

10. A method comprising: receiving, by a near memory controller of a processing system, a first memory read operation from a cache home agent (CHA) directed at a memory address; detecting, by the near memory controller, a miss for the memory address at near memory of a two-level memory system; issuing, by the near memory controller in response to detection of the miss, a second memory read operation to a far memory controller to retrieve a cache line, comprising first data, from the memory address of far memory; receiving, by the near memory controller, the cache line from the far memory controller in response to completion of the second memory read operation; and in response to the cache line being retrieved from the far memory, sending, by the near memory controller, the cache line to the CHA with a change to a directory state of the cache line at the CHA, the changed directory state to cause the CHA to snoop remote sockets to maintain data coherence for the cache line, and write the cache line to the near memory with a set of metadata bits indicating that the cache line is clean and directory bits in the cache line are dirty, wherein based on the set of metadata bits, the cache line is not written to the far memory in response to the cache line being selected to be evicted from the near memory, wherein the near memory maintains the data coherence using directory state in an absence of directory state in the far memory.

11. The method of claim 10, wherein the changed directory state comprises an "any" (A) state, the method further comprising:
retrieving, by the far memory controller, the cache line from the far memory in response to the second memory read operation;
sending, by the far memory controller, the cache line to the near memory controller; and
snooping, by the CHA, the remote sockets for the cache line to maintain data coherence for the cache line.

12. The method of claim 10, further comprising:
updating, by the near memory controller, the directory bits in the cache line to a directory state consistent with a read opcode of the first memory read operation.

13. The method of claim 12, wherein the cache line written to the near memory further comprises the set of metadata bits comprising:
a first bit to indicate whether the first data in the cache line is dirty; and
a second bit to indicate whether the directory bits are dirty.

14. The method of claim 13, further comprising evicting the cache line, wherein evicting comprises:
determining, by the near memory controller, that the first bit of the set of metadata bits indicates that the first data is clean; and
not issuing, by the near memory controller, a memory write operation to write the first data back to the far memory.

15. The method of claim 13, further comprising:
receiving, by the near memory controller, a memory write operation from the CHA directed to the memory address;
determining, by the near memory controller, whether the memory write operation is a directory-only write or includes a data write; and
in response to being a directory-only write, setting, by the near memory controller, the second bit, but not the first bit, of the set of metadata bits, which avoids a write-back to the far memory.

16. The method of claim 15, wherein determining that the memory write operation is the directory-only write comprises determining, by the near memory controller, that an update to the directory bits is necessary based on a current directory state read from the near memory and on an opcode received in the first memory read operation, the method further comprising clearing, by the near memory controller, the second bit of the set of metadata bits to indicate the first data is clean.

17. The method of claim 15, wherein determining that the memory write operation is the directory-only write comprises receiving, by the near memory controller, a direct indication of the directory-only write in the memory write operation from the CHA, the direct indication being based in part on a previous indication received by the CHA from the near memory controller, in response to the first memory read operation, that the first bit indicated the first data was clean.

18. A multi-socket system comprising: system memory comprising near memory and far memory; and a socket coupled to the system memory, the socket comprising: one or more cores, each having cache; a cache home agent (CHA) coupled to the cache; a far memory controller coupled to the far memory; and a near memory controller coupled to the CHA, to the near memory, and to the far memory controller, wherein the near memory controller is to: receive a first memory read operation from the CHA directed at a memory address; detect a miss for the memory address at the near memory; issue, in response to detection of the miss, a second memory read operation to the far memory controller to retrieve a cache line, comprising first data, from the memory address of the far memory; receive the cache line from the far memory controller in response to completion of the second memory read operation; and in response to the cache line being retrieved from the far memory, send the cache line to the CHA with a change to a directory state of the cache line at the CHA, the changed directory state to cause the CHA to snoop remote sockets to maintain data coherence for the cache line, and write the cache line to the near memory with a set of metadata bits indicating that the cache line is clean and directory bits in the cache line are dirty, wherein based on the set of metadata bits, the cache line is not written to the far memory in response to the cache line being selected to be evicted from the near memory, wherein the near memory maintains the data coherence using directory state in an absence of directory state in the far memory.

19. The multi-socket system of claim 18, wherein the far memory controller is to:

retrieve the cache line from the far memory in response to the second memory read operation; and send the cache line to the near memory controller.

20. The multi-socket system of claim 18, wherein the changed directory state comprises an "any" (A) state, and wherein the CHA is to snoop the remote sockets for the cache line to maintain data coherence for the cache line.

21. The multi-socket system of claim 18, wherein the near memory controller is further to:

update the directory bits in the cache line to a directory state consistent with a read opcode of the first memory read operation.

22. The multi-socket system of claim 21, wherein the cache line written to the near memory further comprises the set of metadata bits comprising:

a first bit to indicate whether the first data in the cache line is dirty; and a second bit to indicate whether the directory bits are dirty.

23. The multi-socket system of claim 22, wherein, to evict the cache line, the near memory controller is further to:

determine that the first bit of the set of metadata bits indicates that the first data is clean; and not issue a memory write operation to write the first data back to the far memory.

24. The multi-socket system of claim 22, wherein the near memory controller is further to:

receive a memory write operation from the CHA directed to the memory address;

determine whether the memory write operation is a directory-only write or includes a data write; and in response to being a directory-only write, set the second bit, but not the first bit, of the set of metadata bits, which avoids a write-back to the far memory.

* * * * *